United States Patent [19]

Bresson et al.

[11] 3,993,496

[45] Nov. 23, 1976

[54] EMULSIFIED ASPHALT EMULSION FORTIFIED WITH ASBESTOS FIBERS

[75] Inventors: Clarence R. Bresson; Forrest D. Spaulding, both of Bartlesville, Okla.

[73] Assignee: Phillips Petroleum Company, Bartlesville, Okla.

[22] Filed: Mar. 7, 1975

[21] Appl. No.: 556,482

Related U.S. Application Data

[62] Division of Ser. No. 308,697, Nov. 22, 1972, Pat. No. 3,885,068.

[52] U.S. Cl. .............................. 106/277; 106/281 R; 106/282; 106/283; 252/311.5
[51] Int. Cl.² ...................... C08L 95/00; C09D 3/24
[58] Field of Search ........... 106/277, 281, 282, 283, 106/308 Q; 252/311.5; 427/201, 202, 203, 206, 402, 196; 428/271, 380

[56] References Cited
UNITED STATES PATENTS

| | | | |
|---|---|---|---|
| 3,060,047 | 10/1962 | Graff et al. | 106/277 |
| 3,110,604 | 11/1963 | McConnaughay | 106/277 |
| 3,539,368 | 11/1970 | Timmons et al. | 106/277 |
| 3,615,798 | 10/1971 | Woodruff | 106/277 |
| 3,619,258 | 11/1971 | Bennett et al. | 106/277 UX |
| 3,632,418 | 1/1972 | Draper | 106/277 UX |
| 3,740,344 | 6/1973 | Ferm | 106/277 X |

OTHER PUBLICATIONS

McCutcheon's Detergents and Emulsifiers, 1972, Annual, p. 13.

Primary Examiner—Joan E. Welcome

[57] ABSTRACT

A method for coating a fabric with an asphalt emulsion containing asbestos fibers, the fibers having been pretreated with a non-ionic surface active agent to yield a stable emulsion containing asphalt and fortifying asbestos fibers, useful as a sealant composition which will not extrude from the fabric under elevated hydraulic or fluid pressures. Stable emulsions containing asbestos fibers which have been pretreated with a non-ionic surface active agent are disclosed.

14 Claims, No Drawings

EMULSIFIED ASPHALT EMULSION FORTIFIED WITH ASBESTOS FIBERS

This invention is a divisional of our copending patent application Ser. No. 308,697, filed Nov. 22, 1972, now U.S. Pat. No. 3,885,068.

This invention relates to an asphalt emulsion. In another of its aspects, the invention relates to a stable anionic asphalt emulsion sealant composition containing asbestos fibers. In another aspect, it relates to an anionic asphalt/asbestos emulsion particularly useful for impregnating a fabric to produce a structure impervious to fluids. In another aspect, it relates to a liquid impervious cover structure comprising a fabric impregnated with such an asphalt emulsion.

Various liners have been provided for covering objects or surfaces or the ground to render these impervious to fluids, for example, to water, or other liquids. In places at which the fluid or liquid exerts considerable pressure against the covering structure or liner, leakage is often observed. This leakage occurs at so-called pin hole openings in the coating or covering structure. These leaks have been observed, particularly with non-woven fabrics which have been coated with various sealants. Thus, in fairly deep pond liner applications, it has been observed that asphalt sealed non-woven polypropylene fabric can develop pin hole leaks which may be due to cold flow or pressure extrusion.

We have now conceived of an improved cover structure and an improved asphalt emulsion sealant for use therewith. According to the invention, there is provided an emulsion mixture containing asphalt and asbestos fibers to which there has been preapplied a non-ionic emulsifier or surface active agent which can be applied to a non-woven polyolefin fabric, mat, or web to produce an improved cover structure.

Of the various asphaltic emulsions such as those selected from cationic, anionic and nonionic asphalt emulsions as these are described in the art for example in STANDARD SPECIFICATIONS FOR EMULSIFIED ASPHALT, ASTM D 977-57, we have now discovered that it is definitely preferred to use anionic asphalt emulsions, especially when hydraulic barrier systems involving relatively elevated pressures are involved. The other systems, that is, cationic and nonionic asphalt emulsions are suitable for roofs, roads and decking where there is no substantial pressure head.

It is thus an object of this invention to provide a stable anionic asphalt/asbestos emulsion which when used to impregnate a fabric will yield a barrier material capable of withstanding fluid or hydraulic pressure tending to cause the asphalt to extrude from the fabric. Further, it is an object of this invention to provide an anionic asphalt/asbestos emulsion with improved resistance to asphalt coagulation.

The emulsifier surface active agent can be applied to the asbestos fibers in a variety of ways. Presently an aqueous solution of the agent is applied to the fibers and any excess solution removed. This solution can be applied by dipping, spraying or other means. If desired, the surface active agent can be directly applied to the asbestos fibers without water or other solvents. This method of treatment of the asbestos fibers prior to mixing them with the emulsion containing asphalt is not now preferred.

While the size and amount of asbestos fibers employed in the asphalt emulsion will vary for different types of fabric, one skilled in the art can easily discover by routine testing the amount and size of asbestos fibers that will provide an effective leak-proof liner. Of course, the equipment used to apply the asphalt/asbestos emulsion will also limit to some extent the size and amount of asbestos that can be employed. Naturally when the stable asphalt/asbestos emulsion is to be applied to a non-woven fabric, one cannot use asbestos fibers of size or amount which would make application of the emulsion impractical. Preferably the asbestos fiber is added to the asphalt emulsion in amounts from about 4–15 parts/100parts by weight of asphalt emulsion. It can have a fiber length of about 0.01–0.1 in., preferably about 0.03–0.06 in. While the presence of longer fibers can be tolerated, the preferred range is more readily handled by the usual equipment and best improves the desirable properties of the asphalt, such as the penetration values.

It has been found that using an approximately 4 oz-/yd$^2$ fabric, an asbestos fiber content of about 6–8, or more, parts/100 parts of asphalt emulsion is preferred, while for a 5 oz. web a fiber content of about 5–6 in the asphalt emulsion is sufficient.

Generally the fabric is made from about 2–20 denier, preferably about 3–8 denier crimped staple about ½ to about 3 in. long; a batt of these fibers is needle punched by conventional means and the needle punched fabric is then passed through a pair of nip rolls, one of which is heated above the melting point of the fibers to heat-fuse the fibers on one side. The amount of fusion is adjusted to give the final product a tensile strength of from about 10 lbs. to about 75 lbs/inch of width, the strength depending both on the amount of fusion, weight of fabric and denier of the fiber. The fabric is about 1–5 mm thick under no compression and ordinarily less than about 10% of the thickness of the fabric fused.

The polypropylene fabric should have a weight of at least about 3.4–4 oz/yd$^2$ and is usually fused on one side only. A heavier fabric weighing about 5–6 and up to about 8 oz/yd$^2$ is now preferred over the lighter weight material. Much heavier fabrics become uneconomical and heavy to handle.

A capped product, e.g., a light fabric fused on both sides, having a "cap" of 1–2 oz/yd$^2$ of additional fiber, e.g., nylon, attached to one side thereof by an added needle punch operation and having a total weight between about 4.0 and about 5.5 oz/sq yard is now preferred for hydraulic applications over uncapped fabric. The added fiber now acts as a retention aid for the asphalt/asbestos composition while the water, upon breaking or curing of the emulsion takes place, to pass through, say, to the ground. Thus, the capped side is the one to which the asphalt/asbestos emulsion mixture is applied.

The materials used for capping can be the same as those of the fabric or different.

It is obvious that there are a number of variables which coact to provide an effective leak-proof liner. These variables can be determined by mere routine testing by one skilled in the art in possession of this disclosure.

While any suitable anionic asphalt emulsion known in the art may be employed, preferably the anionic asphalt emulsion is based on petroleum asphalt with penetration at 77° F (25° C) of 40–100, most preferably 70–95, a ductility about 40–50 and a ring and ball softening temperature of at least 120° F (49° C), emulsified in accordance to specifications of ASTM D 977.

A typical recipe for preparing the asphalt emulsion is as follows:

| | |
|---|---|
| UC CMC-P75-XH (carboxymethylcellulose thickener) | 3 lbs. |
| Flake Caustic (NaOH) | 26 lbs. |
| Rosin - Hercules Vinsol | 138 lbs. |
| Soya Flour | 50 lbs |
| Biocide - Dowcide "G" - Dow Chemical | 1.5 lbs. |

Water to make 587 gallons of solution. Add sufficient asphalt to make 1500 gallons of emulsion after homogenization in a colloid mill. The solids content is about 61% (50-65).

5-10 parts by weight of asbestos fibers, as herein described, based on asphalt emulsion, are prewetted with 30-60 parts by weight water containing about 0.01-5% weight nonionic surfactant such as an alkylarylpolyether alcohol, specifically octyl-phenoxypolyethoxyethanol (Triton X-305).

EXAMPLE

Petroleum asphalt, penetration 94, R & B softening temperature 120° F (49° C), and meeting specification of ASTM D 977 was emulsified using the above set forth typical recipe.

100 parts by weight of this asphalt emulsion was combined with 7.5 parts by weight asbestos fibers (Johns Manville 7MO2) 45 parts by weight of water containing 0.5 wt. % of Trition X305, a nonionic detergent.

The resultant emulsion mixture was stable and did not run off when applied to a sloping surface (45° F, 7.22° C). The asphalt/asbestos blend had a Ball and Ring softening point above 220° F (104° C) (glycerin), a penetration value at 77° F (25° C) of 36 and 8.1 cm ductility after it was cured.

These properties make the composition exceptionally suitable for hydraulic seal barriers and sloping roof installations. The stable emulsion mixtures thus prepared were applied to various fabrics, some topcoated with the same or different materials, e.g., non-woven polypropylene capped with polypropylene fibers needled thereon, having a weight of about 5.5 oz/sq. yd., was given two coats, the first having been allowed to cure for 24 hours, for a total weight of about 3 pounds/sq. yd., of the above specific emulsion.

Test procedure was as follows:

A sample of the non-woven fabric was spray-coated with the asphalt emulsion. The coated fabric had no pin holes and was an effective hydraulic barrier at 100° F (37.8° C) and 15 psig. The test was carried out in a static load apparatus in which a sample fabric is subjected to a static hydraulic load at a controlled temperature and the time measured to develop a leak. This sample was tested for 70 hours without failure when the test was discontinued.

Another test of a nylon capcoated polypropylene non-woven fabric base was made with two coats, totalling 3.3 lbs/sq. yd., the emulsion, this time, containing ten parts of the now preferred pretreated asbestos. After 70 hours no failure appeared. The test was discontinued.

It is essential, however, that the asbestos fibers in the mixture be forced by the flow of the liquid through the mat into immediate contact with the surface of the mat where they become imbedded in the unconsolidated top surface of the fabric and lodge in the interstitial voids present therein. The fabric will be given two coats when elevated pressures are expected. This ensures filling of the interstices. After the first coat is substantially cured the second coat is applied to cover the overall surface.

It is within the scope of the invention to preheat the asbestos fibers to ensure better contact between their surfaces and interstices with the surface active agent. The agent can be applied to the fibers with or without heating by fluidizing them and passing the agent therethrough.

Reasonable variation and modification are possible within the scope of the foregoing disclosure and the appended claims of the invention the essence of which is that there has been provided an improved stable emulsion mixture for use for application to various fabrics, particularly in the preparation of hydraulic sealant fabrics as applied to ponds, etc., as herein described, wherein the emulsion mixture contains asphalt and asbestos which has been pretreated with a nonionic surface-active agent before it is blended into an asphalt emulsion to produce said stable emulsion and that a stable asphalt-asbestos emulsion mixture has been set forth, also as described herein.

We claim:

1. A stable anionic asphalt-asbestos emulsion sealant composition comprising an anionic asphalt emulsion and a sufficient amount of suitable asbestos fibers to insure that when said asphalt-asbestos emulsion is employed to impregnate a fabric it will produce a cover structure capable of withstanding fluid or hydraulic pressure, said asbestos fibers having had a sufficient amount of nonionic surface-active agent applied thereto prior to the mixing of said fibers with said emulsion to insure that said fibers will not cause asphalt coagulation.

2. The composition according to claim 1 wherein the asbestos fibers were preheated prior to the application of the surface-active agent.

3. The composition according to claim 1 wherein the surface-active agent is applied to the fibers as an aqueous solution.

4. The composition according to claim 3 wherein the aqueous solution contains about 0.01-5 weight % nonionic surface-active agent.

5. The composition according to claim 4 wherein about every 5 to about 10 parts by weight of asbestos fiber are prewetted with about 30 to about 60 parts by weight of said aqueous solution.

6. A composition according to claim 1 wherein the asbestos fiber has a fiber length of about 0.01-0.1 inch and there are about 4 to about 15 parts by weight of said fiber for every 100 parts by weight of said anionic asphalt emulsion.

7. A composition according to claim 6 wherein said asbestos fiber have a fiber length of about 0.03 to about 0.06 inch.

8. A composition according to claim 6 wherein the anionic asphalt emulsion is based on petroleum asphalt having a penetration at 77° F (25° C) of about 40-100, a ductility of about 40-50, and a ring ball softening temperature of at least 120° F (44° C).

9. A cover structure capable of withstanding fluid or hydraulic pressure comprising a non-woven polyolefin fabric impregnated with the anionic asphalt-asbestos emulsion sealant composition of claim 6.

10. A cover structure according to claim 9 wherein said fabric is made from about 2 to about 20 denier crimped staple said fabric has a weight between about 3.5 and about 8 oz/sq. yd., and said fabric is fused only on one side.

11. A composition according to claim 8 wherein every 5 to 10 parts by weight of asbestos fibers are prewetted with 30 to 60 parts by weight of an aqueous solution containing about 0.01–5 weight percent of octyl-phenoxypolyethoxyethanol and then the resulting mixture of asbestos fibers and said solution is combined with said anionic asphalt emulsion.

12. A composition according to claim 11 prepared from about 100 parts by weight of said anionic asphalt emulsion, about 7.5 parts by weight of asbestos fibers, and about 45 parts by weight of an about 0.5 weight percent aqueous solution of octyl-phenoxypolyethoxyethanol.

13. A cover structure capable of withstanding fluid or hydraulic pressure comprising a non-woven polypropylene fabric having a weight of about 5.5 oz./sq. yd., coated with about 3 lb./sq. yd. of the composition of claim 12.

14. A cover structure according to claim 10 having a "cap" of 1–2 oz./yd.$^2$ of fiber attached by needle punching to one side of said fabric and the fabric is impregnated by applying the asphalt emulsion to the "capped" side.

* * * * *